United States Patent [19]

Reimelt

[11] Patent Number: 5,950,681
[45] Date of Patent: Sep. 14, 1999

[54] METHOD OF RENOVATING PIPES

[76] Inventor: Andreas Reimelt, Lessingstrasse 41, 68723 Schwetzingen, Germany

[21] Appl. No.: 08/619,696

[22] PCT Filed: Sep. 29, 1993

[86] PCT No.: PCT/DE93/00919

§ 371 Date: Jun. 6, 1996

§ 102(e) Date: Jun. 6, 1996

[87] PCT Pub. No.: WO95/09320

PCT Pub. Date: Apr. 6, 1995

[51] Int. Cl.$^6$ ............................... F16L 55/18; B05D 7/22
[52] U.S. Cl. ........................... 138/97; 427/181; 427/235; 134/22.11; 451/36
[58] Field of Search ........................ 138/97, 98; 405/154; 427/235, 238, 230, 181; 134/22.11, 22.12; 451/36

[56] References Cited

U.S. PATENT DOCUMENTS

| 2,331,824 | 10/1943 | Buckingham | 427/235 |
| 3,073,687 | 1/1963 | McCune | 451/61 |
| 3,139,704 | 7/1964 | McCune | 451/76 |
| 3,307,996 | 3/1967 | Keneipp, Jr. | 156/287 |
| 3,494,813 | 2/1970 | Lawrence et al. | |
| 3,946,125 | 3/1976 | Scheiber | 427/46 |
| 4,022,935 | 5/1977 | Kinney et al. | 427/140 |
| 4,233,101 | 11/1980 | Scragg et al. | 156/287 |
| 4,327,132 | 4/1982 | Shinno | 427/235 |
| 4,454,173 | 6/1984 | Koga | 427/235 |
| 4,505,613 | 3/1985 | Koga | 138/97 X |
| 5,007,461 | 4/1991 | Naf | 138/97 |

FOREIGN PATENT DOCUMENTS

| 0 299 134 | 1/1989 | European Pat. Off. . |
| 2 526 124 | 11/1983 | France . |
| 1 042 026 | 9/1966 | United Kingdom . |
| WO 92/01191 | 1/1992 | WIPO . |

Primary Examiner—Patrick Brinson
Attorney, Agent, or Firm—Alston & Bird LLP

[57] ABSTRACT

A process of renovating pipes wherein a particulate abrasive agent is passed through the pipe to loosen the internal deposits. The process involves initially drying the pipe by drawing preheated air through the pipe, then drawing the abrasive agents through the pipe, and then coating the inner wall of the pipe with a metered quantity of a viscous hardening coating material. All of these steps may include the application of a suction to one end of the pipe, so that the pipe is always exposed only to a low pressure.

18 Claims, No Drawings

METHOD OF RENOVATING PIPES

BACKGROUND OF THE INVENTION

The present invention relates to a method of renovating pipes which have two open ends, and wherein any internal coating is removed by passing abrasive agents therethrough.

The pipes to be renovated with the present invention include gas-, steam-, or liquid-carrying pipes which have already been installed. The pipes in question include inlet or outlet pipes for the transport of water or gas in residential, industrial or municipal facilities, including private and industrial sewerage. All pipes of this kind tend to develop deposits which are in particular due to the build-up of scale from water, the formation of rust inside the pipe, precipitation from flowing agents, reaction products of flowing media and substances contained therein in and/or the pipe material, and effects that are combinations thereof. The aforementioned effects cause leakages or substantially reduce the internal diameter of the pipes which in turn interferes with the transport of the flowing medium or even renders such a transport impossible.

The now claimed method of renovating pipes helps avoid a complete replacement of the pipes, a fact that is particularly advantageous when dealing with completely installed sanitary facilities. The pipes of such installations are usually more or less freely accessible once the fittings are removed so that it is possible to apply the claimed cleaning and coating method. It is in any case essential that a pipe be accessible at least two open ends for the individual steps of the method to be carried out. The claimed method does not exclude an at least partial conventional repair of the pipe; the entire pipework can, hence, be partially replaced or partially renovated with the aid of the claimed method.

Methods of the kind in question have been known in the practice for a long time. For an example, refer to European patent application 0 229 134. This European patent application discloses a class-defining method wherein compressed air is used to dry the pipe, remove the deposits at the inside of the pipe, preheat the pipe, and, finally, coat the inside of the pipe. In other words, the method of the invention employs compressed air as such or as a carrier medium to be pressed through the pipe. However, in the practice the use of compressed air is problematic in that compressed air easily destroys already corroded pipes in the area of bends or turns. If the pipe has already leakages, compressed air will escape at the site of leakage and consequently also lead to a corresponding loss of medium carried along by the compressed air. Moreover, compressed air blocks the pipe when the latter already exhibits considerable deposits at its inside thus requiring a considerable amount of work to eliminate the blockage. Parts that were torn away by the compressed air tend to accumulate in bends, and finally lead to a complete blockage of the pipe. This necessitates the pulsed application of compressed air from the other end of the pipe which in turn requires more complex instrumentation and more time and consequently significantly increases the costs.

Further, the known method exhibits the significant disadvantage that it is hardly or not at all possible to detect leakages during the use of the method and/or the application of compressed air. There is, consequently, a risk that the inside is coated despite significant leakages while it is almost impossible to close these leakages. A large leakage or hole is, hence, virtually "stabilized" by the coating and can no longer be effectively closed.

Finally, the known method entails a significant environmental problem in that the particles which are carried along by the compressed air are released into the environment at the open end of the pipe. It is consequently necessary to provide, in addition to the generator for the compressed air at the pipe inlet, special collecting means to collect the particles carried along by the compressed air. In any case, it is impossible to allow the uncontrolled release of the compressed air emerging at the other open end into the environment. This in turn again considerably increases the amount of instrumentation involved.

It is accordingly an object of the present invention to provide a method for renovating pipes where conductive properties are attained which are comparable to those of new pipes while using simple technical means and avoiding pollution of the environment.

SUMMARY AND DETAILED DESCRIPTION OF THE INVENTION

The above and other objects and advantages of the present invention are achieved by the provision of a process for renovating pipes comprising the steps of drying the pipe by drawing preheated air through the pipe by means of a suction, removing deposits on the inner wall of the pipe by flowing abrasive agents through the pipe by means of a suction, and coating the inner wall of the pipe with a viscous hardening coating material. The coating material is metered into one end of the pipe while drawing a suction at the opposite end and such that the entire inner wall of the pipe is coated with substantially no amount of the coating material emerging at the opposite end of the pipe. As will thus be apparent, the method of the present invention may be performed such that the drying air, the abrasive agents, and the coating material may be drawn into and through the pipe while the pipe is permanently exposed to low pressure.

The pipe is preferably heated after the deposits are removed and before the coating material is introduced. Also, it is preferred that the suction applied during the drying step is drawn off via a filtering device.

In accordance with the invention, it has first been found that the compressed air used in prior art may lead to damages to the pipe to be renovated and/or cause blockages in the pipe, on the one hand, and, on the other hand, lead to considerable pollution unless particular measures are taken as the compressed air which is introduced into the pipe emerges at the outlet, under high pressure, into the environment together with noxious substances. Special collecting and filtering devices are, hence, required in addition to the compressed air generator at the inlet which in turn renders instrumentation more complex and increases the costs. Apart from the compressed air generator, the method of the invention does not require additional instrumentation as it proposes that the suction process be carried out from one end of the pipe only; the drawn in air containing the particles and the like is then collected and/or received in a device that is located upstream of the suction device. An additional particular advantage is that the method in accordance with the invention can largely be carried out from one end of the pipe, i.e. the side of suction. Only the viscous coating material must be introduced into the pipe at the other open end; this can be done prior to the suction process so that still only one single operator is required to start and execute the coating procedure.

Finally, another most significant advantage of the method in accordance with the invention is that the vacuum generated at the side of suction decreases toward the open end of the pipe. The force at which particles are torn away consequently increases as the distance toward the outlet and/or low pressure end decreases; the resulting pressure gradient that builds up toward the outlet, hence, effectively prevents blockages as they are torn away and/or dissolved to a greater extent with a decreasing distance toward the outlet. Finally, the method of the invention allows detecting leakages in that the pressure drops at the outlet if such a leakage is present. Such a sudden pressure drop indicates a suddenly occurring hole in the pipe.

With respect to an implementation of the method of the invention that is particularly beneficial to the environment, it is advantageous to not simply draw off the air used to preheat the pipe but rather guide the air through a filtering device when passing it through or withdrawing it from the pipe. The compressor used for this purpose could directly precede the filtering device without requiring additional instrumentation.

The abrasive agents used to remove internal deposits can be any type of particle that can be carried by an air flow; however, it must be harder than the internal deposits to be removed. When renovating water pipes, a particle size ranging between 0.3 mm and 6 mm has proven to be expedient. A specific weight of more than 3.0 $g/cm^3$ has also proven to be advantageous with air being the carrier medium. Concrete examples of abrasive particles include corundum or silica sand. The abrasive particles could also be configured as metal particles, particularly ferromagnetic particles. The use of such particles allows the subsequent magnetic separation of the abrasive particles from the detached deposit which can be rust or scale build-up, as already stated above.

The application of the coating agent and, hence, good wetting of the inner wall of the pipe, on the one hand, followed by fast hardening, on the other hand, is supported by the fact that the pipe is heated up to a temperature above room temperature after the deposits at the inside have been removed. A temperature of approximately 40° C. has proven to be particularly expedient for this purpose. The pipe could be heated up by using correspondingly heated air which is allowed to be drawn through the pipe until the desired temperature is achieved at the outlet. This could be detected via the temperature drop between the inlet end and outlet end of the pipe. It is in any case preferable that the pipe be heated up in that hot air is passed through via suction and not by pressing through compressed air. Finally, the preheated air used to heat up the pipe could also be drawn off via a filtering device; said filtering device could also directly precede the compressor used for the suction process.

Moreover, the pipe could be heated up in a most advantageous manner by the exclusive or additional use of a heating device which is drawn into pipe after the cleaning procedure and prior to coating the pipe's inner wall. Provided the capacity of the heating device in the pipe is sufficient, it would not be absolutely necessary to draw in hot air. Especially when dealing with extremely long pipes, said heating device could prevent air which is drawn in at the end of the pipe from cooling down; this would considerably accelerate the heating process. The heating device used for this purpose could advantageously be a heating wire, especially a self-regulating heating wire. A heating wire of this type could be configured as a resistance heating wire with a ceramic insulation of the heating conductor. Basically however, it is possible to employ any device that can be introduced or drawn into a pipe.

For an effective heating of the pipe it is also advantageous that the heating wire extend essentially along the entire length of the pipe. This ensures uniform heating of the pipe.

With respect to introducing the heating wire it is particularly advantageous to draw the wire into the pipe with the aid of a towing system. Such a towing system could be a parachute-type element or the like that is pulled through the pipe as a consequence of the low pressure prevailing inside the pipe thus dragging the heating wire along.

Once the pipe is sufficiently heated, the heating wire is advantageously pulled out of the pipe prior to coating the inner wall of the pipe. The heating wire can be pulled out of the pipe from either the inlet or the outlet side, i.e. where the low pressure is generated; in the latter case, the power connections at the inlet side would have to be removed.

The coating material is then introduced into the heated pipe while a low pressure is again generated at the outlet. Owing to this low pressure, the coating material is drawn into the pipe together with ambient air; due to the different viscosities between air and coating material, the viscous coating material is pressed against the wall of the pipe to cover it. The use of resin or synthetic resin or plastic as a coating material allows a continuous coating of the inner wall of the pipe, while the pressure difference necessary to draw in the coating material is provided by the vacuum generated at the outlet.

If significant leakages are present, fibers, especially short fibers, may be incorporated in the coating material; glass fibers are most advantageously preferred. The glass fibers will adhere to the rim of the leakage due to the irregular arrangement the opening and thus provide sufficient support for the viscous coating material to close the leakage. It is thus possible to close at least small holes and leakages.

Moreover, in order to avoid additional environmental stress and possible disposal requirements, it would be most advantageous to introduce such an amount of coating agent at the free end of the pipe that the entire inner wall of the pipe is coated while there are no substantial amounts of coating material emerging at the other end. In other words, based on the normal thickness of the coating and the length of the pipe to be coated, the approximate amount of coating material needed could be predetermined, thus avoiding that unneeded coating material which would then have to be disposed of correspondingly emerges at the suction end.

In the method of the invention when suction is generated at the outlet, it is also possible to close the free end of the pipe for a certain period of time; the gradually generated low pressure could then be used to detect possible leakages. If it is difficult to adjust a low pressure condition inside the pipe, the pipe to be renovated has considerable leakages.

In order to check the condition of the already cleaned pipe prior to the actual coating procedure or to check the quality of the coat, it is also possible to draw in an optical means to inspect the pipe or assure the quality of the internal coat. This can also be accomplished with the aid of a towing system. The optical means can in the most simple case be a glass fiber cable to allow light to enter the pipe and/or guide the light beams reflected therein out of the pipe. It is possible to provide bundles of glass fibers or different glass fiber cables for various purposes. In a most sophisticated embodiment, the optical means can comprise an endoscopy-type device, i.e. a miniaturized camera with a corresponding light unit which can be introduced into the pipe and may even feature a miniaturized tool to collect samples and the like.

I claim:

1. A method of renovating a pipe which has at least two ends, and comprising the steps of drying the pipe by drawing preheated air through the pipe by means of a suction and via a filtering device, removing deposits on an inner wall of the pipe by flowing abrasive agents through the pipe, and including introducing the agents into the pipe from one of its ends while drawing a suction at the opposite end, and coating the inner wall of the pipe with a viscous hardening coating material, and including metering the amount of the coating material into one of the open ends of the pipe while drawing a suction at the opposite end and such that the entire inner wall of the pipe is coated with substantially no amount of the coating material emerging at the opposite end of the pipe.

2. The method as defined in claim 1 comprising the further step of heating the pipe after the step of removing deposits and before the coating step.

3. The method as defined in claim 2 wherein the heating step includes heating the pipe to about 40° C. by drawing heated air through the pipe.

4. The method as defined in claim 3 wherein the heating step further includes drawing heated air through the pipe via a filtering device.

5. The method as defined in claim 2 wherein the abrasive agents are particles having a grain size ranging between 0.3 mm and 6 mm.

6. The method as defined in claim 5 wherein the particles have a specific weight greater than 3.0 g/cm3.

7. The method as defined in claim 6 wherein the particles comprise corundum or silica sand.

8. The method as defined in claim 6 wherein the particles comprise ferromagnetic particles.

9. A method of renovating a pipe which has at least two ends, and comprising the steps of drying the pipe by drawing preheated air through the pipe by means of a suction, removing deposits on an inner wall of the pipe by flowing abrasive agents through the pipe, and including introducing the agents into the pipe from one of its ends while drawing a suction at the opposite end, heating the pipe and including drawing a heating wire through the pipe, and then coating the inner wall of the pipe with a viscous hardening coating material, and including metering the amount of the coating material into one of the open ends of the pipe while drawing a suction at the opposite end and such that the entire inner wall of the pipe is coated with substantially no amount of the coating material emerging at the opposite end of the pipe.

10. The method as defined in claim 9 wherein the heating wire is self regulating.

11. The method as defined in claim 9 wherein the heating wire extends along the entire length of the pipe.

12. The method as defined in claim 9 wherein the heating step includes drawing the heating wire through the pipe via a towing system.

13. The method as defined in claim 9 wherein the heating wire is removed from the pipe prior to the coating step.

14. A method of renovating a pipe which has at least two ends, and comprising the steps of drying the pipe by drawing preheated air through the pipe by means of a suction, removing deposits on an inner wall of the pipe by flowing abrasive agents through the pipe, and including introducing the agents into the pipe from one of its ends while drawing a suction at the opposite end, and coating the inner wall of the pipe with a viscous hardening coating material, and including metering the amount of the coating material into one of the open ends of the pipe while drawing a suction at the opposite end and such that the entire inner wall of the pipe is coated with substantially no amount of the coating material emerging at the opposite end of the pipe, and wherein the coating material comprises a synthetic resin or plastic and relatively short fibers incorporated therein.

15. A method of renovating a pipe which has at least two ends, and comprising the steps of drying the pipe by drawing preheated air through the pipe by means of a suction, removing deposits on an inner wall of the pipe by flowing abrasive agents through the pipe, and including introducing the agents into the pipe from one of its ends while drawing a suction at the opposite end, coating the inner wall of the pipe with a viscous hardening coating material, and including metering the amount of the coating material into one of the open ends of the pipe while drawing a suction at the opposite end and such that the entire inner wall of the pipe is coated with substantially no amount of the coating material emerging at the opposite end of the pipe, and detecting possible leakages in the pipe by closing one end of the pipe, drawing a suction at the opposite end, and monitoring the pressure within the pipe.

16. A method of renovating a pipe which has at least two ends, and comprising the steps of drying the pipe by drawing preheated air through the pipe by means of a suction, removing deposits on an inner wall of the pipe by flowing abrasive agents through the pipe, and including introducing the agents into the pipe from one of its ends while drawing a suction at the opposite end, coating the inner wall of the pipe with a viscous hardening coating material, and including metering the amount of the coating material into one of the open ends of the pipe while drawing a suction at the opposite end and such that the entire inner wall of the pipe is coated with substantially no amount of the coating material emerging at the opposite end of the pipe, and inspecting the inner wall of the pipe to monitor the quality of the coating by drawing an optical device into the pipe.

17. The method as defined in claim 16 wherein the optical device includes a glass fiber cable.

18. The method as defined in claim 16 wherein the optical device comprises an endoscope.

* * * * *